US008294106B2

(12) United States Patent
Nakajima (10) Patent No.: US 8,294,106 B2
(45) Date of Patent: Oct. 23, 2012

(54) TERAHERTZ ANTENNA MODULE (75) Inventor: Kazutoshi Nakajima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 521 days.

(21) Appl. No.: 12/523,270

(22) PCT Filed: Mar. 12, 2008

(86) PCT No.: PCT/JP2008/054503
§ 371 (c)(1),
(2), (4) Date: Jul. 15, 2009

(87) PCT Pub. No.: WO2008/117664
PCT Pub. Date: Oct. 2, 2008

(65) Prior Publication Data
US 2010/0072373 A1 Mar. 25, 2010

(30) Foreign Application Priority Data

Mar. 26, 2007 (JP) ................. P2007-079595

(51) Int. Cl.
*G01J 5/08* (2006.01)
(52) U.S. Cl. .................................. 250/353
(58) Field of Classification Search ............ 250/353
See application file for complete search history.

(56) References Cited

U.S. PATENT DOCUMENTS

| 6,777,684 | B1 * | 8/2004 | Volkov et al. ............ 250/341.1 |
| 7,145,505 | B2 | 12/2006 | Gottwald et al. |
| 2005/0105075 | A1 | 5/2005 | Gottwald et al. |

FOREIGN PATENT DOCUMENTS

| JP | 54-11654 | 1/1979 |
| JP | 4-74005 | 3/1992 |
| JP | 8-139514 | 5/1996 |
| JP | 2000-174543 | 6/2000 |
| JP | 2000-196346 | 7/2000 |
| JP | 2002-152069 | 5/2002 |
| JP | 2004-207288 | 7/2004 |
| JP | 2004207288 A * | 7/2004 |
| JP | 2004-274656 | 9/2004 |
| WO | 2005/080947 | 9/2005 |

* cited by examiner

*Primary Examiner* — David Porta
*Assistant Examiner* — Shun Lee
(74) *Attorney, Agent, or Firm* — Drinker Biddle & Reath LLP (57) ABSTRACT

In a terahertz antenna module 1, a photoconductive antenna element 17 is fixed to a wiring board 9, and electrically connected to an electric signal input/output pin 24 of an electric signal input/output port 23 via a signal electrode of the wiring board 9. Further, a buffer member 7, a hemispherical lens 8, a photoconductive antenna element 17, and the wiring board 9 are disposed in a recess 3 of a container 2 in this order from an opening 6 side of the container 2, and by attaching a cover 25 to the container 2, the wiring board 9, the photoconductive antenna element 17, and the hemispherical lens 8 are pressed against the buffer member 7. Further, the wiring board 9 is positioned by the recess 4 and the hemispherical lens 8 is positioned by the buffer member 7 so that the optical axis OA of the hemispherical lens 8 passes just through a photoconductive antenna part of the photoconductive antenna element 17.

7 Claims, 11 Drawing Sheets

TERAHERTZ ANTENNA MODULE

TECHNICAL FIELD

The present invention relates to a terahertz antenna module for generating or detecting a terahertz wave.

BACKGROUND ART

As a conventional terahertz antenna module, for example, Patent Document 1 describes a terahertz photodetector including a terahertz light condenser lens and a terahertz photodetection element which are bonded to each other by using silicon grease, etc., and supported on a main body block. In this terahertz photodetector, the terahertz light condenser lens and the terahertz photodetection element are positioned by a main body block, a lens holding plate, and a substrate holding member, and fixed to the main body block by a pushing member in a state where a conducting member is disposed on an electrode part of the terahertz photodetection element via silver paste.

Patent Document 1: Japanese Published Unexamined Patent Application No. 2004-207288

DISCLOSURE OF THE INVENTION

Problem to Be Solved by the Invention

However, in the terahertz photodetector described in Patent Document 1, for positioning the terahertz light condenser lens and the terahertz photodetection element and realizing transmission of electric signals to the terahertz photodetection element, a large number of fine components are used, so that the structure becomes complicated, which is a problem.

Therefore, the present invention was made in view of the above-described circumstances, and an object of the present invention is to provide a terahertz antenna module whose structure can be simplified.

Means for Solving the Problem

To achieve the above-described object, a terahertz antenna module of the present invention is a terahertz antenna module for generating or detecting a terahertz wave, and includes a container having a recess and an opening formed on the bottom surface of the recess; a buffer member disposed in the recess so as to surround the opening while being in contact with the inner surface of the recess; a hemispherical lens which is disposed in the recess while a spherical surface portion is in contact with the buffer member, and transmits a terahertz wave; a wiring board which includes a substrate for allowing light of a predetermined wavelength to pass through and an electrode for transmitting electric signals, and is disposed in the recess; a photoconductive antenna element which is fixed to the wiring board so that light of a predetermined wavelength is irradiated onto a photoconductive antenna part while being in contact with a flat portion of the hemispherical lens, and electrically connected to the electrode;

and a cover which is attached to the container and presses the wiring board, the photoconductive antenna element, and the hemispherical lens against the buffer member.

In this terahertz antenna module, the photoconductive antenna element is fixed to the wiring board and electrically connected to the electrode of the wiring board. Further, the buffer member, the hemispherical lens, the photoconductive antenna element, and the wiring board are disposed in the recess of the container in this order from the opening side of the container, and by attaching the cover to the container, the wiring board, the photoconductive antenna element, and the hemispherical lens are pressed against the buffer member. Accordingly, transmission of electric signals to the photoconductive antenna element via the electrode of the wiring board can be realized even with a simple structure, and at least in the optical axis direction of the hemispherical lens, the hemispherical lens and the photoconductive antenna element can be properly positioned.

In the terahertz antenna module of the present invention, preferably, the recess includes a first portion on the opening side and a second portion on the cover side, and the second portion is made wider in width than the first portion as viewed from the opening side, and in the first portion, at least the buffer member is disposed, and in the second portion, at least the wiring board is disposed. Further, more preferably, the wiring board is properly positioned by the recess and the hemispherical lens is properly positioned by the buffer member so that the optical axis of the hemispherical lens passes just through the photoconductive antenna part. Accordingly, the hemispherical lens and the photoconductive antenna element can be properly positioned in the direction orthogonal to the optical axis direction of the hemispherical lens with a simple structure.

In the terahertz antenna module of the present invention, preferably, the buffer member is formed into an annular shape with an inner diameter smaller than the diameter of the spherical surface portion. Accordingly, the hemispherical lens can be reliably held and positioned while being prevented from being broken.

In the terahertz antenna module of the present invention, it is also possible that the electrode is pulled out from the surface opposite to the surface on the photoconductive antenna element side of the substrate through a via hole. Accordingly, easy access to the electrode of the wiring board can be realized.

In the terahertz antenna module of the present invention, the substrate may have a light pass hole through which light of a predetermined wavelength passes, and the substrate may be made of a material which allows transmitting light of a predetermined wavelength. Accordingly, light of a predetermined wavelength can be irradiated as excitation light onto the photoconductive antenna part of the photoconductive antenna element.

In the terahertz antenna module of the present invention, preferably, the cover functions as a leaf spring and presses the wiring board, the photoconductive antenna element, and the hemispherical lens against the buffer member. Accordingly, the wiring board, the photoconductive antenna element, and the hemispherical lens can be reliably and easily pressed against the buffer member.

Effect of the Invention

The present invention can simplify the structure.

DESCRIPTION OF SYMBOLS

1 ... terahertz antenna module, 2 ... container, 3 ... recess, 4 ... recess (second portion), 5 ... recess (first portion), 6 ... opening, 7 ... buffer member, 8 ... hemispherical lens, 8a ... spherical surface portion, 8b ... flat portion, 9 ... wiring board, 11 ... substrate, 12 ... light pass hole, 13 ... light transmissive member, 14 ... signal electrode, 15 ... ground electrode, 16 ... through hole, 17 ... photoconductive antenna element, 18 ... semi-insulating GaAs substrate, 19 ... GaAs layer, 21 ... ohmic electrode, 22 ... photoconductive antenna part, 23 ... electric signal input/output port, 24 ... electric signal input/output pin, 25 ... cover, 26 ... screw, 27 ... light pass hole.

Best Modes for Carrying out the Invention

Hereinafter, a preferred embodiment of the present invention will be described in detail with reference to the drawings. In the respective drawings, portions identical or equivalent to each other are attached with the same reference numerals and letters, and overlapping description is omitted.

Figure 1:
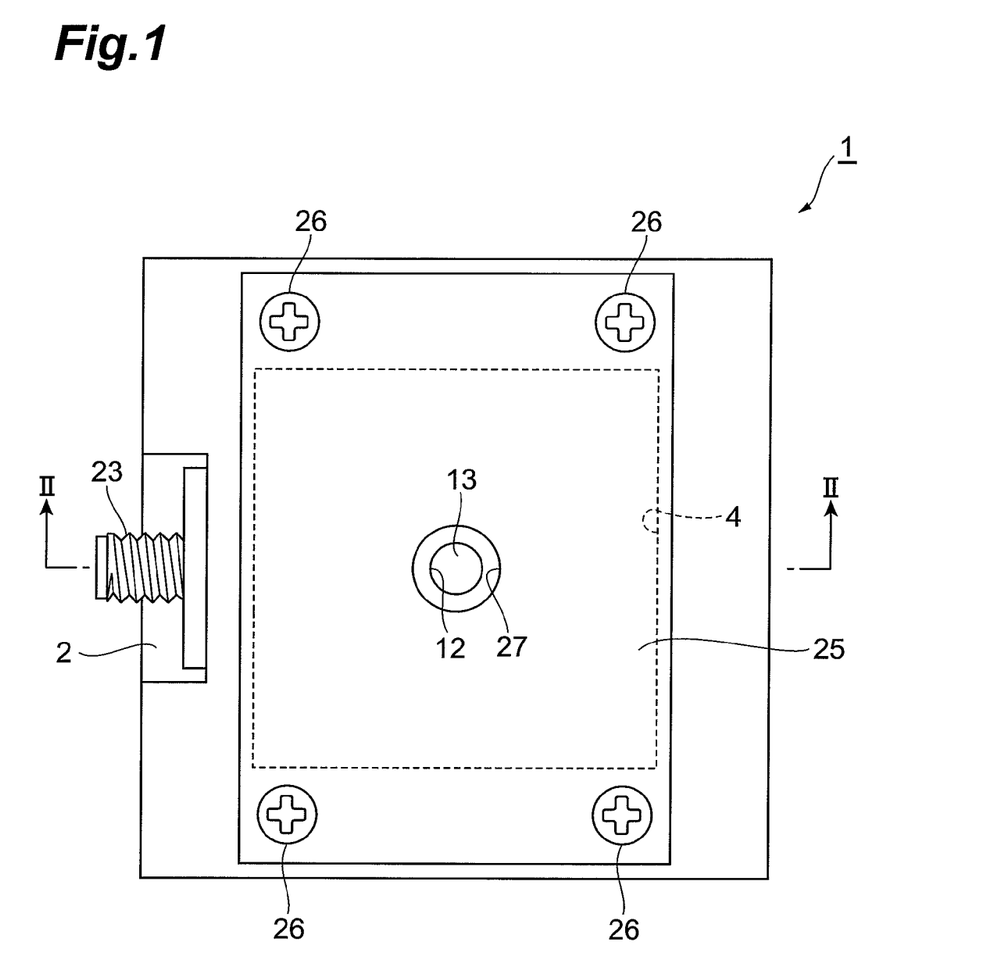
FIG. 1 is a back view of an embodiment of a terahertz antenna module of the present invention.
Figure 2:
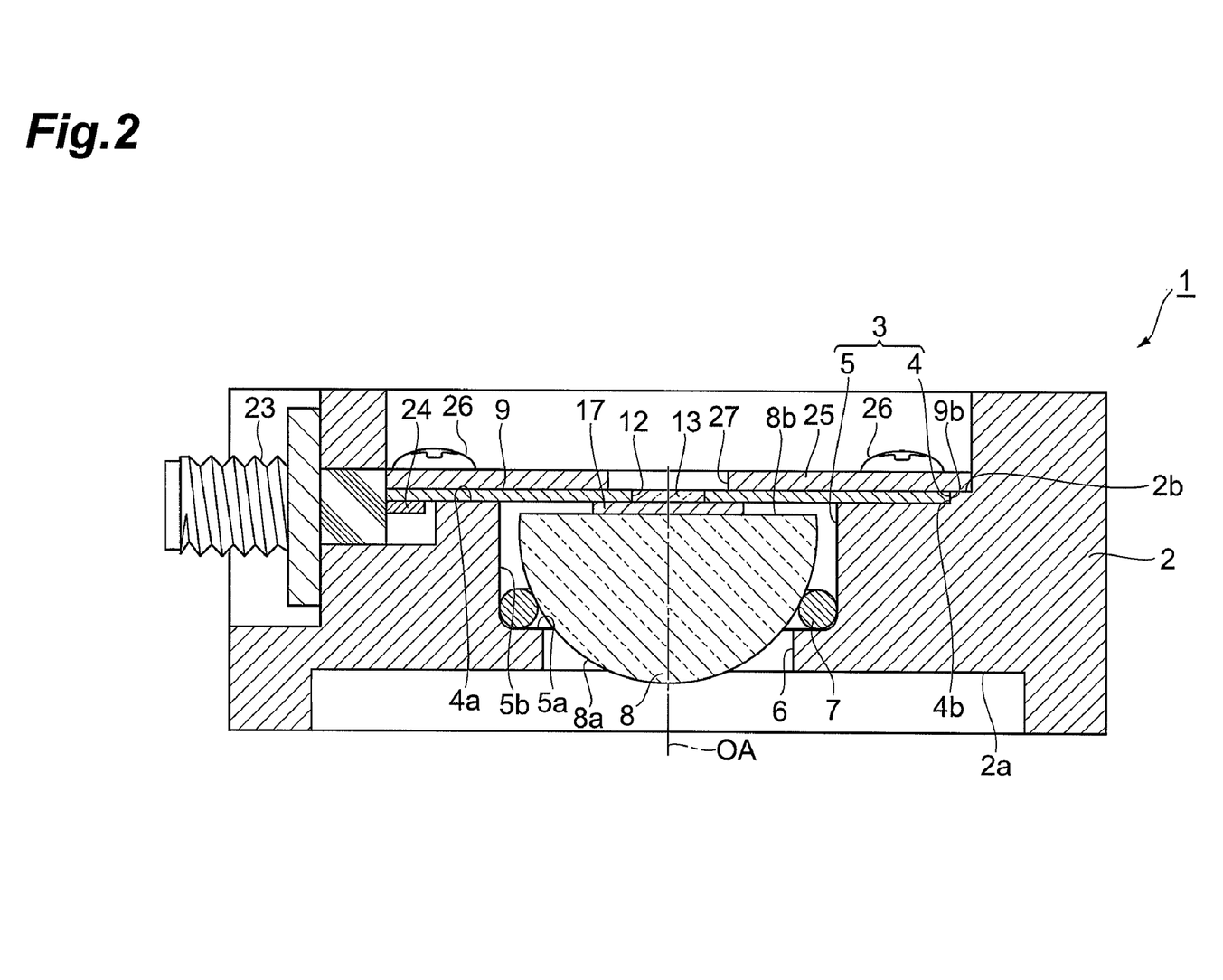
FIG. 2 is a sectional view along the II-II line shown in FIG. 1.

As shown in FIG. 1 and FIG. 2, the terahertz antenna module 1 generates a terahertz wave and emits it forward (downward in FIG. 2), or detects a terahertz wave made incident from the front side (lower side in FIG. 2). The terahertz antenna module 1 includes a rectangular parallelepiped container 2 made of a metal. The container 2 may have a metal film formed on the surface of a matrix made of plastic or ceramic.

The container 2 has a recess 3 formed on the rear surface 2b. The recess 3 includes a recess (second portion) 4 having a rectangular section formed on the rear surface 2b of the container 2, and a recess (first portion) 5 having a circular section formed on the bottom surface 4a of the recess 4. Further, the container 2 has an opening 6 formed in the bottom surface 5a of the recess 5 (that is, the bottom surface of the recess 3). The opening 6 is pierced from the bottom surface 5a of the recess 5 to the front surface 2a of the container 2. The recess 4 is made wider in width than the recess 5 as viewed from the opening 6 side (that is, from the front side). Further, preferably, for protecting the tip end of the hemispherical lens 8 described later, the container 2 is provided with a frame around the front surface 2a.

In the recess 5, an annular buffer member 7 made of a material with resiliency and elasticity is disposed so as to surround the opening 6 while being in contact with the bottom surface 5a and the side surface 5b of the recess 5. As a material of the buffer member 7, vinyl, plastic, Teflon (trademark), etc., can be used, and as an easily available buffer member 7, an O-ring can be used.

Further, in the recess 5, a hemispherical lens 8 which transmits a terahertz wave is disposed in a state where a spherical surface portion 8a is in contact with the buffer member 7. In other words, the inner diameter of the buffer member 7 is smaller than the diameter of the spherical surface portion 8a. The flat portion 8b of the hemispherical lens 8 is substantially in parallel to the bottom surface 4a of the recess 4, and the vertex of the spherical surface portion 8a faces the outside via the opening 6. As a material of the hemispherical lens 8, high-resistance silicon with high transparency for a terahertz wave is used, and as a shape of the hemispherical lens 8, for efficient radiation or condensing of a terahertz wave, a hyper hemispherical lens is preferable.

Figure 3:
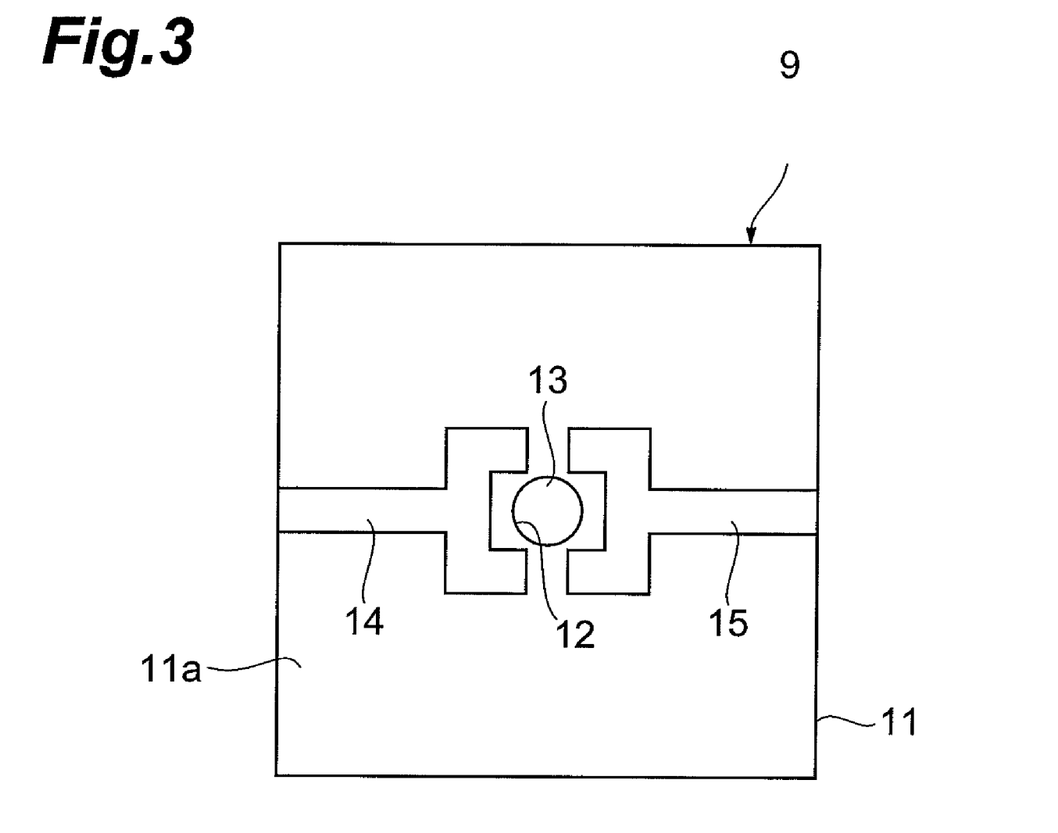
FIG. 3 is a front view of a wiring board of the terahertz antenna module shown in FIG. 1.

In the recess 4, a rectangular wiring board 9 is disposed so that the side surface 9b is along the side surface 4b of the recess 4. As shown in FIG. 3, the wiring board 9 has a rectangular substrate 11 made of an insulating material such as ceramic or glass-mixed epoxy resin. At the central portion of the substrate 11, a light pass hole 12 having a circular section through which visible to infrared light (light with a predetermined wavelength) made incident from the rear side (upper side in FIG. 2) passes is formed. Accordingly, the substrate 11 allows visible to infrared light to pass through. In the light pass hole 12, preferably, a light transmissive member 13 made of a material which transmits visible to infrared light such as glass or quartz is fitted. Accordingly, the surface of the photoconductive antenna element 17 described later can be protected.

On the front surface 11a of the substrate 11, a signal electrode 14 and a ground electrode 15 made of a metal are formed and opposed to each other across the light pass hole 12. The signal electrode 14 is an electrode for transmitting electric signals and is electrically connected to an electric signal input/output pin 24 of an electric signal input/output port 23 described later. The ground wire 15 is an electrode for grounding, and is electrically connected to the container 2 with conductivity.

Figure 4:
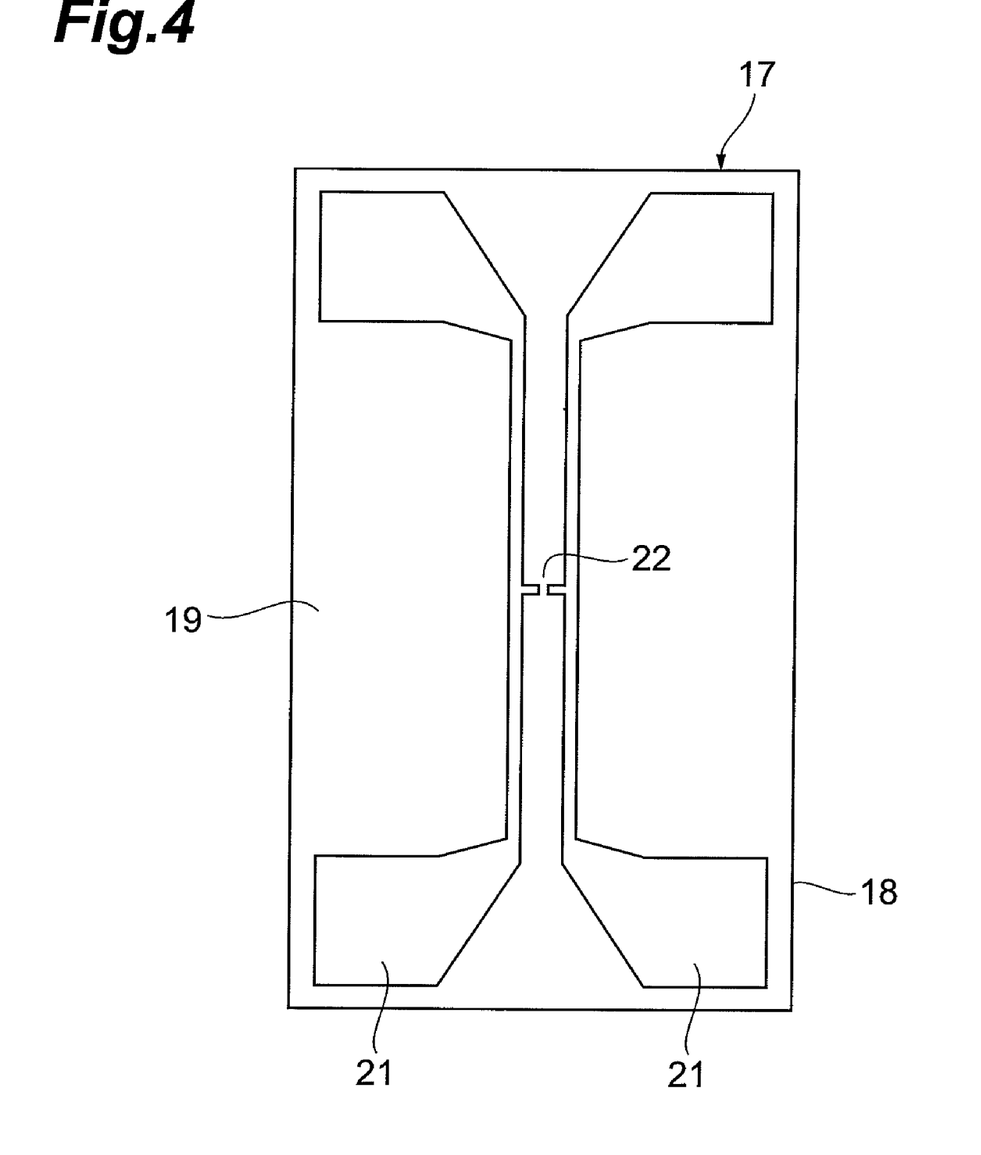
FIG. 4 is a back view of a photoconductive antenna element of the terahertz antenna module shown FIG. 1.

As shown in FIG. 2, to the wiring board 9, a photoconductive antenna element 17 having a rectangular thin plate shape is fixed in contact with the flat portion 8b of the hemispherical lens 8. As shown in FIG. 4, the photoconductive antenna element 17 includes a semi-insulating GaAs substrate 18, a GaAs layer 19 formed by low-temperature MBE (molecular beam epitaxy) on the semi-insulating GaAs substrate 18, and a pair of ohmic electrodes 21 and 21 formed on the GaAs layer 19. The pair of ohmic electrodes 21 and 21 are formed into an antenna shape and form a photoconductive antenna part 22 at the central portion of the photoconductive antenna element 17.

Figure 5:
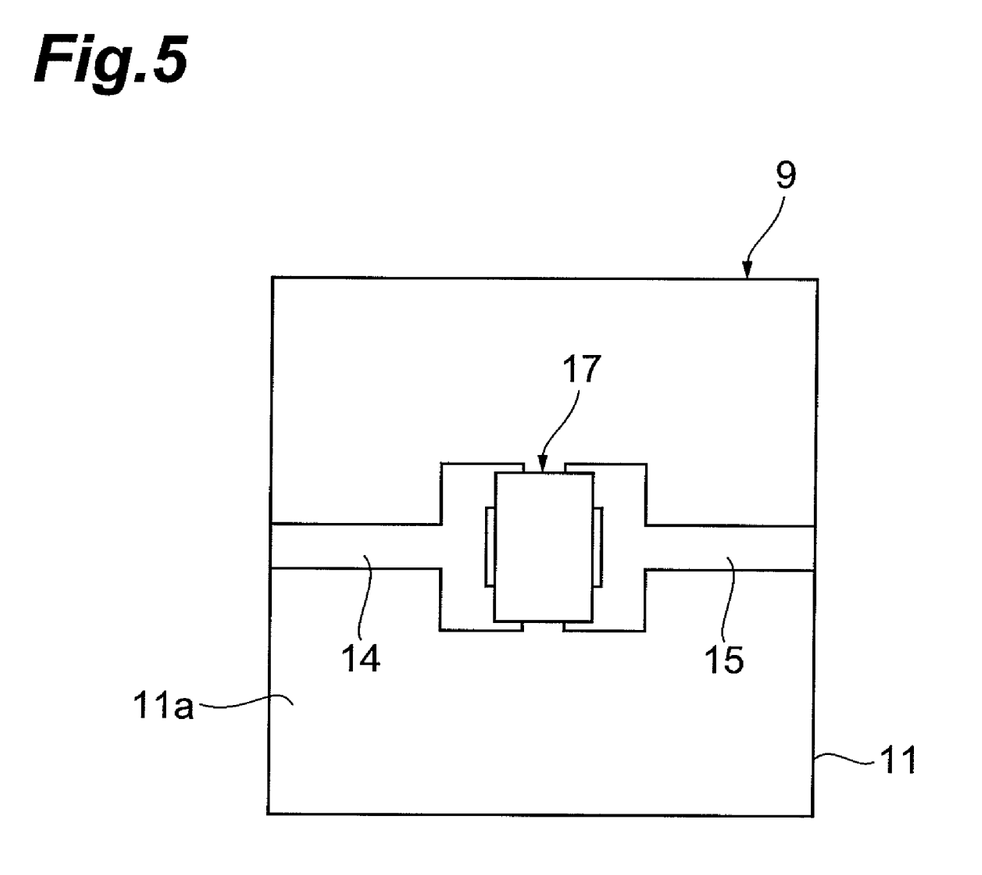
FIG. 5 is a front view of a wiring board in a state where a photoconductive antenna element is attached with the terahertz antenna module shown in FIG. 1.

As shown in FIG. 5, the photoconductive antenna element 17 is mounted to the wiring board 9 by flip-chip bonding so that the photoconductive antenna part 22 is opposed to the light pass hole 12 of the substrate 11 (that is, visible to infrared light which passed through the substrate 11 is irradiated onto the photoconductive antenna part 22). For the bonding, Au or solder bump, alternatively Ag paste or conductive epoxy resin, etc., is used, and one ohmic electrode 21 of the photoconductive antenna element 17 is electrically connected to the signal electrode 14 of the wiring board 9, and the other ohmic electrode 21 of the photoconductive antenna element 17 is electrically connected to the ground electrode 15 of the wiring board 9. By positioning one ohmic electrode 21 at the signal electrode 14 and the other ohmic electrode 21 at the ground electrode 15 properly, the photoconductive antenna part 22 is automatically opposed to the light pass hole 12.

As shown in FIG. 1 and FIG. 2, to the container 2, an electric signal input/output port 23 is attached using screws, etc. The electric signal input/output pin 24 of the electric signal input/output port 23 is electrically connected to the signal electrode 14 formed on the front surface 11a of the substrate 11 on the wiring board 9. As the electric signal input/output port 23, a compact and general-purpose coaxial connector such as SMA or BNC can be used.

To the rear surface 2b of the container 2, a cover 25 having a rectangular thin plate shape is attached using screws 26. In the cover 25, a light pass hole 27 is formed so as to surround the light pass hole 12 of the wiring board 9. The cover 25 presses the wiring board 9, the photoconductive antenna element 17, and the hemispherical lens 8 against the buffer member 7, and at the same time, presses the wiring board 9 against the electric signal input/output pin 24 of the electric signal input/output port 23 and the bottom surface 4a of the recess 4 of the container 2. As a material of the cover 25, a metal is preferably used so that the cover 25 functions as a leaf spring capable of reliably and easily pressing the wiring board 9, etc., against the buffer member 7, however, ceramic or plastic, etc., can also be used. The light transmissive member 13 may be fitted in the light pass hole 27 instead of the light pass hole 12, and whichever the light transmissive member is fitted in either the light pass hole 12 or 27, the photoconductive antenna part 22 of the photoconductive antenna element 17 can be protected.

In the state where the wiring board 9, the photoconductive antenna element 17, and the hemispherical lens 8 are pressed against the buffer member 7 by the cover 25, the wiring board 9 is positioned by the recess 4 and the hemispherical lens 8 is positioned by the buffer member 7 so that the optical axis OA of the hemispherical lens 8 passes just through the photoconductive antenna part 22 of the photoconductive antenna element 17. At this time, the inner diameter of the buffer member 7 is formed into an annular shape smaller than the diameter of the spherical surface portion 8a of the hemispherical lens 8, so that while the hemispherical lens 8 is prevented from coming into direct contact with the container 2 and being broken, the spherical lens 8 can be reliably held and positioned. The photoconductive antenna element 17 is not directly fixed to the container 2, so that the photoconductive antenna element 17 can be prevented from being broken. Accordingly, the back surface of the photoconductive antenna element 17 is directly fixed in contact with the flat portion 8b of the hemispherical lens 8, so that in comparison with the method of bonding by using silicon grease, etc., absorption of specific frequency spectrum of a terahertz wave can be prevented.

Operations of the terahertz antenna module 1 configured as described above will be described.

When the terahertz antenna module 1 is used as a terahertz wave generating module, a bias voltage is applied between the pair of ohmic electrodes 21 and 21 of the photoconductive antenna element 17 via the electric signal input/output port 23 and the signal electrode 14 of the wiring board 9, and visible to infrared light is irradiated as excitation light onto the photoconductive antenna part 22 of the photoconductive antenna element 17 via the light pass hole 12 of the wiring board 9. Accordingly, free carriers excited in the GaAs layer 19 of the photoconductive antenna element 17 are accelerated in the electric field generated by the bias voltage, and a current flows between the pair of ohmic electrodes 21 and 21. In response to this current change, a terahertz wave is generated and emitted forward via the hemispherical lens 8.

When the terahertz antenna module 1 is used as a terahertz wave detecting module, visible to infrared light is irradiated as probe light onto the photoconductive antenna part 22 of the photoconductive antenna element 17 via the light pass hole 12 of the wiring board 9, and free carriers are excited in the GaAs layer 19 of the photoconductive antenna element 17. At this time, when a terahertz wave is made incident on the photoconductive antenna part 22 from the front side via the hemispherical lens 8, free carriers excited in the GaAs layer 19 are accelerated in the electric field of the terahertz wave, and a current flows between the pair of ohmic electrodes 21 and 21 of the photoconductive antenna element 17. This current is detected via the signal electrode 14 of the wiring board 9 and the electric signal input/output port 23.

Next, a method for assembling the terahertz antenna module 1 will be described.

Figure 6:
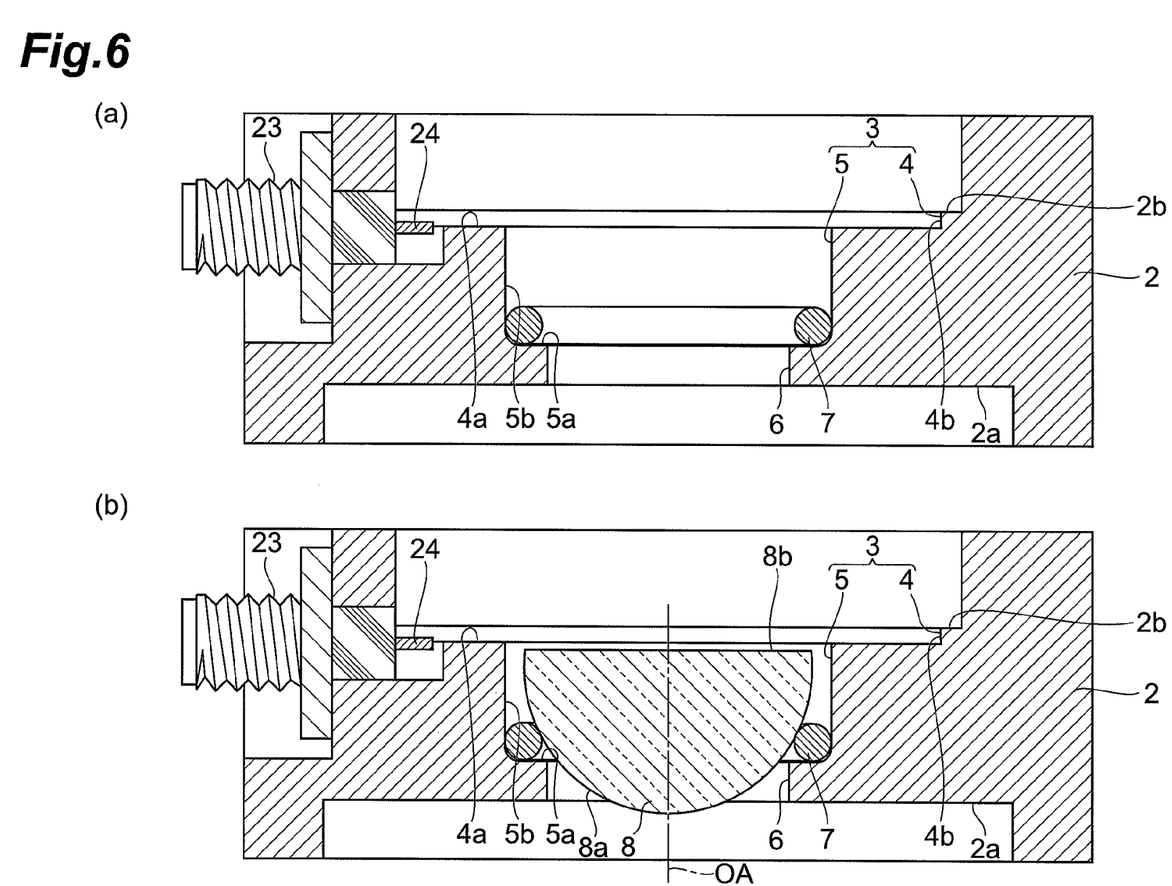
FIG. 6 are sectional views for describing a method for assembling the terahertz antenna module shown in FIG. 1.

First, as shown in FIG. 6(a), the buffer member 7 is disposed in the recess 5 so as to surround the opening 6 while being in contact with the bottom surface 5a and the side surface 5b of the recess 5 of the container 2. Subsequently, as shown in FIG. 6(b), the hemispherical lens 8 is disposed in the recess 5 while the spherical surface portion 8a is in contact with the buffer member 7.

Figure 7:
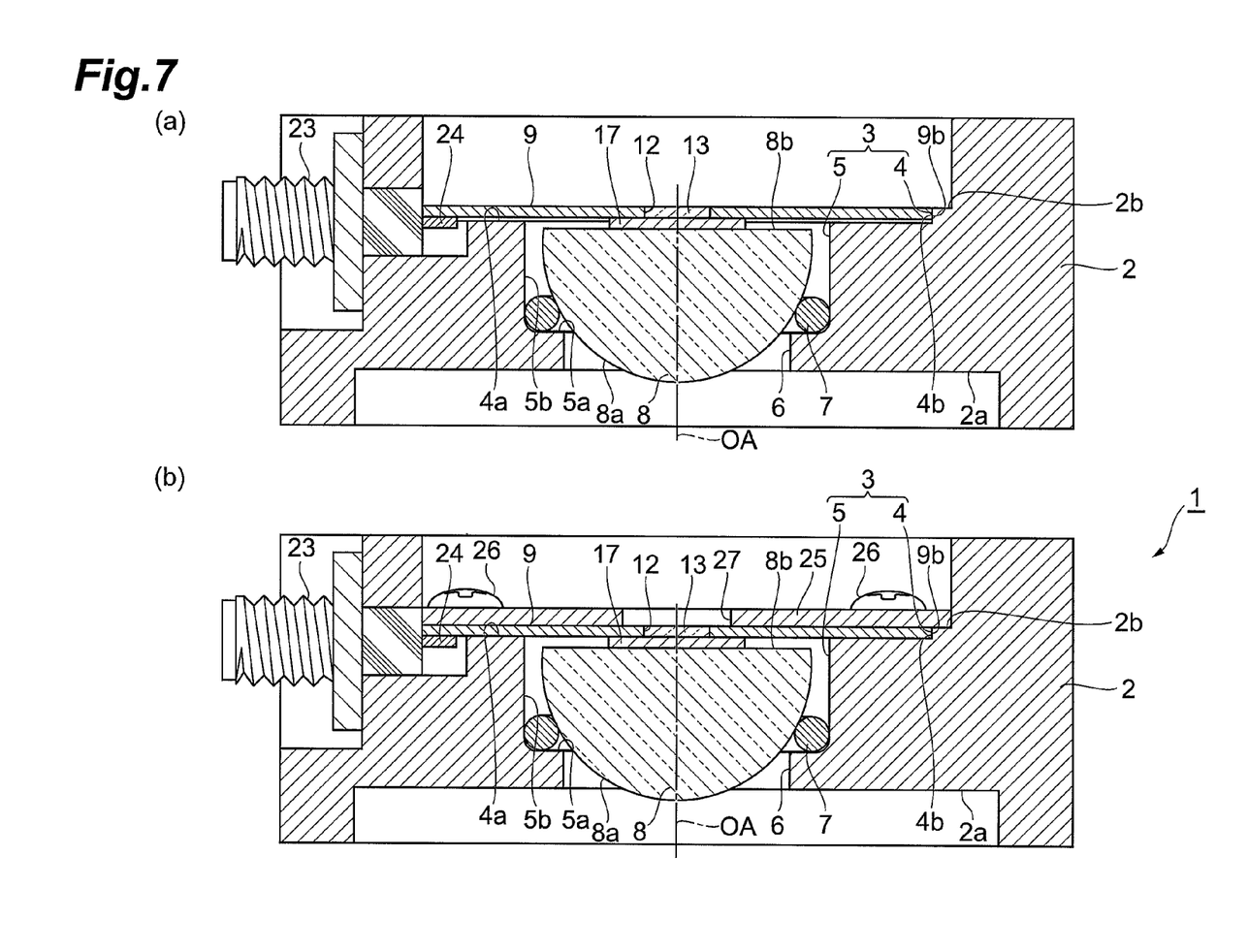
FIG. 7 are sectional views for describing a method for assembling the terahertz antenna module shown in FIG. 1.

Thereafter, as shown in FIG. 7(a), the wiring board 9 to which the photoconductive antenna element 17 is fixed is disposed in the recess 4 so that the photoconductive antenna element 17 is in contact with the flat portion 8b of the hemispherical lens 8 while the side surface 9b is along the side surface 4b of the recess 4 of the container 2. At this time, the rear surface (that is, the rear surface 11b of the substrate 11) of the wiring board 9 slightly projects from the rear surface 2b of the container 2.

Subsequently, as shown in FIG. 7(b), the cover 25 is attached to the rear surface 2b of the container 2 using screws 26, and the wiring board 9, the photoconductive antenna element 17, and the hemispherical lens 8 are pressed against the buffer member 7. Accordingly, the photoconductive antenna element 17 and the flat portion 8b of the hemispherical lens 8 reliably come into contact directly with each other, the electric signal input/output pin 24 of the electric signal input/output port 23 and the signal electrode 14 of the wiring board 9 reliably come into contact directly with each other, and the container 2 and the ground wire 15 of the wiring board 9 reliably come into contact directly with each other.

As described above, in the terahertz antenna module 1, the photoconductive antenna element 17 is fixed to the wiring board 9, and is electrically connected to the electric signal input/output pin 24 of the electric signal input/output port 23 via the signal electrode 14 of the wiring board 9 and to the container 2 via the ground wire 15 of the wiring board 9. The buffer member 7, the hemispherical lens 8, the photoconductive antenna element 17, and the wiring board 9 are disposed in the recess 3 of the container 2 in this order from the opening 6 side of the container 2, and by attaching the cover 25 to the container 2, the wiring board 9, the photoconductive antenna element 17, and the hemispherical lens 8 are pressed against the buffer member 7. Further, the wiring board 9 is positioned by the recess 4 and the hemispherical lens 8 is positioned by the buffer member 7 so that the optical axis OA of the hemispherical lens 8 passes just through the photoconductive antenna part 22 of the photoconductive antenna element 17. Accordingly, transmission of electric signals to the photoconductive antenna element 17 via the signal electrode 14 of the wiring board 9 can be realized even with a simple structure. Further, although the structure is simple, the hemispherical lens 8 and the photoconductive antenna element 17 can be positioned in the optical axis OA direction of the hemispherical lens 8 and the direction orthogonal to the optical axis OA direction.

Further, there is no need to interpose silicon grease, etc., between the photoconductive antenna element 17 and the flat portion 8b of the hemispherical lens 8, so that absorption of specific frequency spectrum of a terahertz wave by the silicon grease, etc., can be prevented.

As described above, the structure of the terahertz antenna module 1 is simple, so that the terahertz antenna module 1 can be very easily assembled.

The present invention is not limited to the above-described embodiment.

FIG. 8 to FIG. 11 show another embodiment of a terahertz antenna module of the present invention. In the terahertz antenna module 1 shown in FIG. 8 to FIG. 11, on the wiring board 9, the signal electrode 14 is pulled out from the front surface 11a of the substrate 11 to the rear surface 11b of the substrate 11 through the via hole 16 formed in the substrate 11. In this case, when assembling, the substrate 11 is slid into the gap between the electric signal input/output pin 24 of the electric signal input/output port 23 and the rear surface 2b of the container 2. Thereafter, the electric signal input/output pin 24 of the electric signal input/output port 23 and the signal electrode 14 pulled out from the rear surface 11b of the substrate 11 on the wiring board 9 are electrically connected to each other by solder, etc. In this case, the signal electrode 14 is pulled out from the rear surface 11b of the substrate 11, so that access to the signal electrode 14 of the wiring board 9 is very easy, and the electric signal input/output pin 24 and the signal electrode 14 can be reliably and easily electrically connected.

Figure 8:
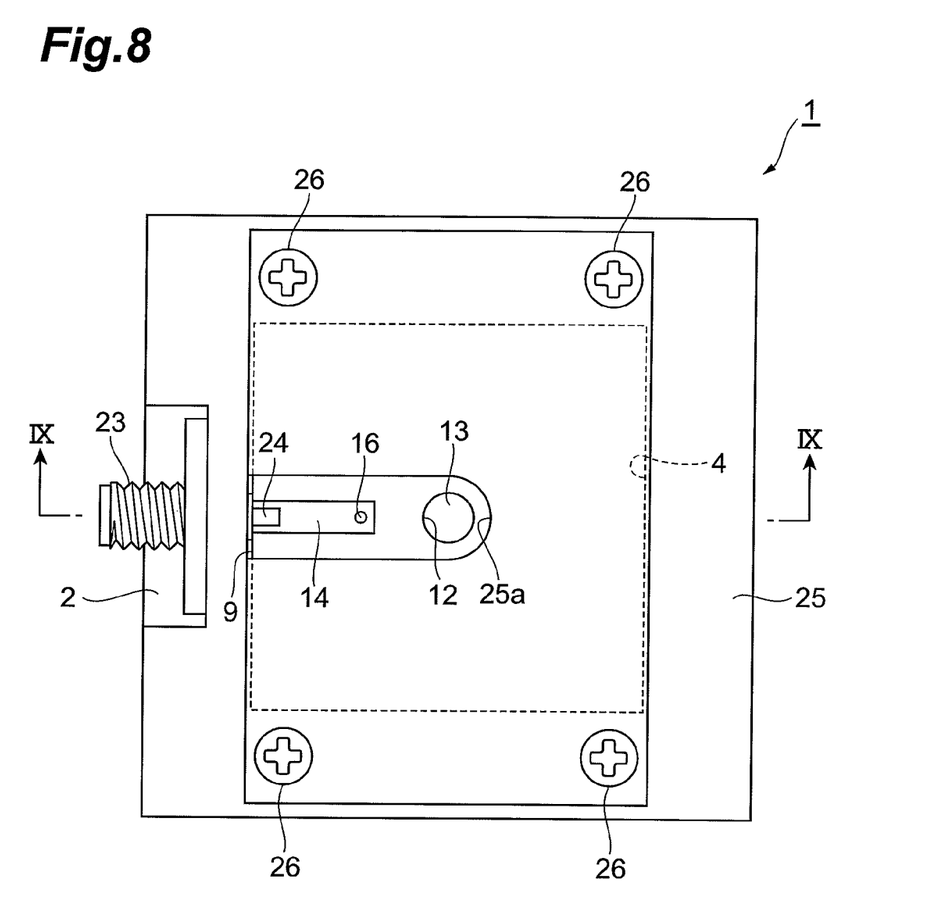
FIG. 8 is a back view of another embodiment of a terahertz antenna module of the present invention.
Figure 9:
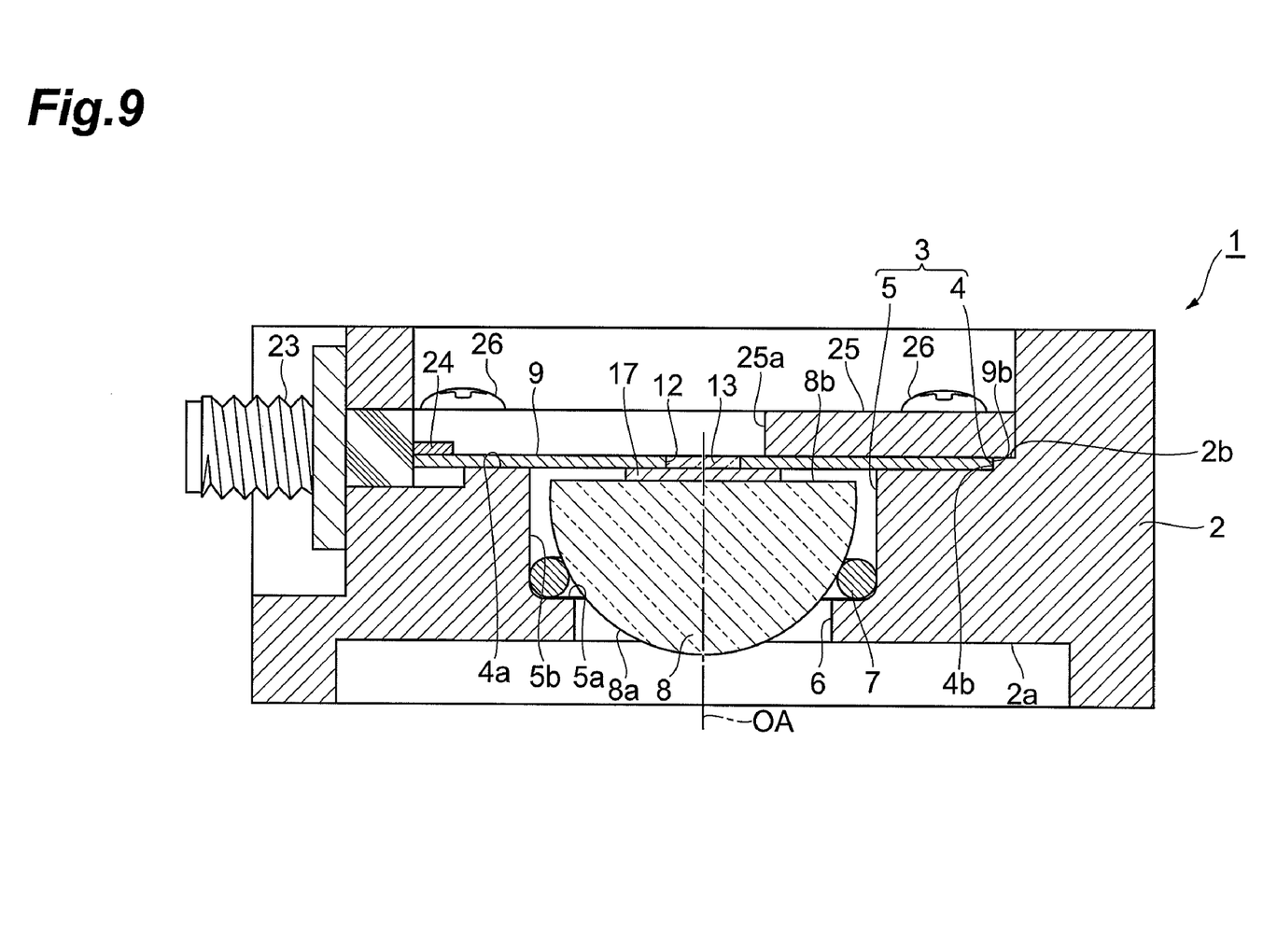
FIG. 9 is a sectional view along the IX-IX line show in FIG. 8.
Figure 10:
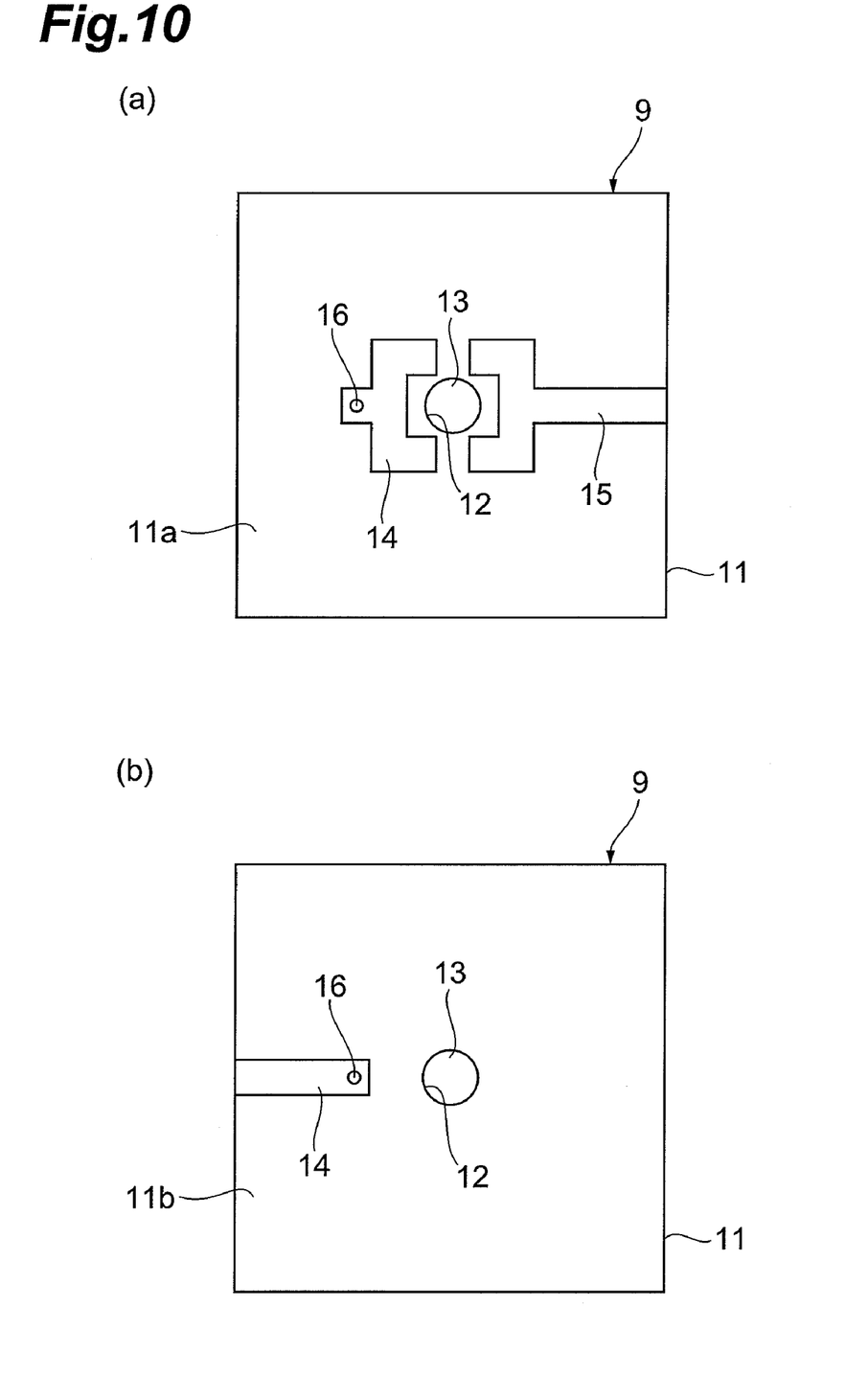
FIG. 10(a) is a front view and FIG. 10(b) is a back view of a wiring board of the terahertz antenna module shown in FIG. 8.
Figure 11:
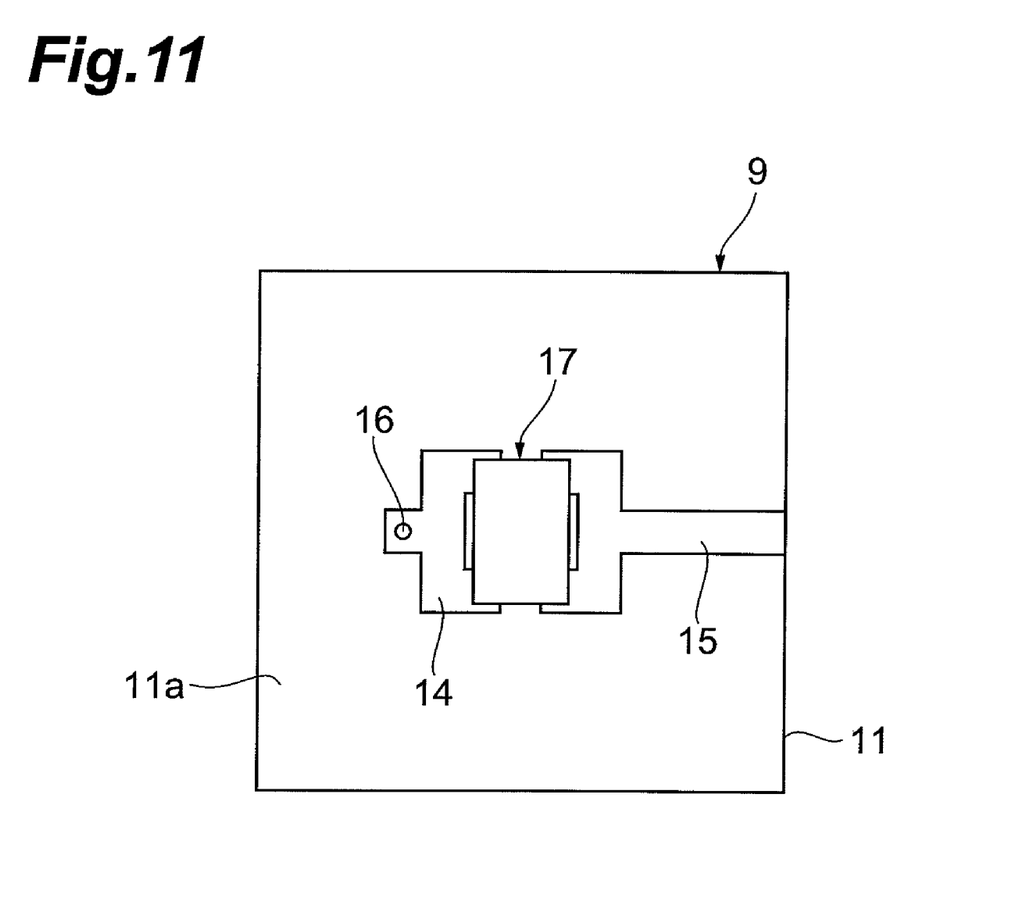
FIG. 11 is a front view of the wiring board in a state where a photoconductive antenna element is attached with the terahertz antenna module shown in FIG. 8.

Further, as shown in FIG. 8, when the cover 25 is made of a metal, a notch 25a is formed so as to avoid the electric signal input/output port 23 and the light pass hole 12 of the wiring board 9 from covering these. In this case, when the cover 25 is made of an insulating material such as ceramic or plastic, as shown in FIG. 1, only the light pass hole 27 may be provided. Alternatively, even when the cover 25 is made of a metal, by applying insulating treatment such as formation of an insulating film on the front surface of the cover 25, only the light pass hole 27 may be provided instead of the notch 25a.

Further, to irradiate, for example, visible to infrared light (light of a predetermined wavelength) as excitation light onto the photoconductive antenna part 22 of the photoconductive antenna element 17, the substrate 11 of the wiring board 9 may be made of a material which transmits visible to infrared light, such as glass or quartz. In this case, the light pass hole 12 and the light transmissive member 13 become unnecessary, so that the structure of the wiring board 9 can be simplified, and the thickness thereof can be freely designed, and the degree of freedom for designing increases, which is an advantage.

Industrial Applicability

The present invention can simplify the structure.

The invention claimed is:

1. A terahertz antenna module for generating or detecting a terahertz wave, comprising:
a container having a recess and an opening formed on the bottom surface of the recess;
a buffer member disposed in the recess so as to surround the opening while being in contact with the inner surface of the recess;
a hemispherical lens which is disposed in the recess while a spherical surface portion is in contact with the buffer member, and transmits a terahertz wave;
a wiring board which includes a substrate for allowing light of a predetermined wavelength to pass through and an electrode for transmitting electric signals, and is disposed in the recess;
a photoconductive antenna element which is fixed to the wiring board so that light having a predetermined wavelength is irradiated onto a photoconductive antenna part while being in contact with a flat portion of the hemispherical lens, and electrically connected to the electrode of the wiring board; and
a cover which is attached to the container and presses the wiring board, the photoconductive antenna element, and the hemispherical lens against the buffer member, wherein the wiring board is positioned by the recess and the hemispherical lens is positioned by the buffer member so that the optical axis of the hemispherical lens passes through the photoconductive antenna part.

2. The terahertz antenna module according to claim 1, wherein the recess includes a first portion on the opening side and a second portion on the cover side, and the second portion is made wider in width than the first portion as viewed from the opening side, and in the first portion, at least the buffer member is disposed, and in the second portion, at least the wiring board is disposed.

3. The terahertz antenna module according to claim 1, wherein the buffer member is formed into an annular shape with an inner diameter smaller than the diameter of the spherical surface portion.

4. The terahertz antenna module according to claim 1, wherein the electrode is pulled out from the surface opposite to the surface on the photoconductive antenna element side of the substrate through a via hole.

5. The terahertz antenna module according to claim 1, wherein the substrate has a light pass hole through which light of a predetermined wavelength passes.

6. The terahertz antenna module according to claim 1, wherein the substrate is made of a material which allows transmitting light of a predetermined wavelength.

7. The terahertz antenna module according to claim 1, wherein the cover functions as a leaf spring and presses the wiring board, the photoconductive antenna element, and the hemispherical lens against the buffer member.

* * * * *